(12) United States Patent
Lauer

(10) Patent No.: US 7,549,107 B1
(45) Date of Patent: Jun. 16, 2009

(54) INTERLEAVED REED SOLOMON CODING FOR HOME NETWORKING

(75) Inventor: Joseph Paul Lauer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/573,243

(22) Filed: May 18, 2000

(51) Int. Cl.
*H03M 13/00* (2006.01)

(52) U.S. Cl. .................. 714/756; 714/784

(58) Field of Classification Search ........... 370/389, 370/441, 470, 337, 421, 354, 482, 252, 276; 348/21; 714/755, 752, 784, 701, 756, 758, 714/786; 455/522; 375/222, 348, 267, 375; 725/74, 81, 143, 725; 379/67.1, 93.08; 713/176

See application file for complete search history.

(56) References Cited

U.S. PATENT DOCUMENTS

| | | | |
|---|---|---|---|
| 4,559,625 A * | 12/1985 | Berlekamp et al. | 714/701 |
| 5,383,204 A * | 1/1995 | Gibbs et al. | 714/758 |
| 5,448,593 A * | 9/1995 | Hill | 375/267 |
| 5,666,370 A | 9/1997 | Ganesan et al. | 371/37.01 |
| 5,708,961 A * | 1/1998 | Hylton et al. | 725/81 |
| 5,727,025 A * | 3/1998 | Maryanka | 375/257 |
| 5,896,443 A * | 4/1999 | Dichter | 379/93.08 |
| 5,910,949 A * | 6/1999 | Bilstrom et al. | 370/337 |
| 6,005,477 A * | 12/1999 | Deck et al. | 370/482 |
| 6,034,996 A | 3/2000 | Herzberg | 375/265 |
| 6,069,899 A * | 5/2000 | Foley | 370/494 |
| 6,130,894 A * | 10/2000 | Ojard et al. | 370/421 |
| 6,157,642 A * | 12/2000 | Sturza et al. | 370/389 |
| 6,201,563 B1 * | 3/2001 | Rhee | 348/21 |
| 6,263,466 B1 * | 7/2001 | Hinedi et al. | 714/755 |
| 6,292,917 B1 * | 9/2001 | Sinha et al. | 714/752 |
| 6,323,788 B1 | 11/2001 | Kim et al. | |
| 6,337,877 B1 * | 1/2002 | Cole et al. | 375/222 |
| 6,377,814 B1 * | 4/2002 | Bender | 455/522 |
| 6,389,034 B1 * | 5/2002 | Guo et al. | 370/441 |
| 6,438,109 B1 * | 8/2002 | Karaoguz et al. | 370/252 |
| 6,449,288 B1 * | 9/2002 | Chari et al. | 370/470 |

(Continued)

FOREIGN PATENT DOCUMENTS

WO    WO 98/43374    10/1998

(Continued)

OTHER PUBLICATIONS

"Performance Enhancement Using Forward Error Correction On Power Line Communication Channels", Chan et al., Apr. 1994, IEEE vol. 9, pp. 645-653.*

(Continued)

*Primary Examiner*—David Ton

(57) ABSTRACT

A method of transmitting data packets over a non-dedicated local area network channel susceptible to random burst and/or white gaussian noise channel errors. Each data packet is encoded to form an error correctable encoded data packet, which is then interleaved, modulated and transmitted over the channel. The channel can be a telephone line. The encoding includes performing Reed Solomon encoding on each data packet to form Reed Solomon error correctable encoded data packets. Each data packet is cyclic redundancy check encoded prior to performing Reed Solomon encoding. Also disclosed is a corresponding method of receiving data packets over a non-dedicated local area network channel, and a corresponding system for transmitting and receiving data packets over a non-dedicated local area network channel.

53 Claims, 5 Drawing Sheets

U.S. PATENT DOCUMENTS

| | | | |
|---|---|---|---|
| 6,480,976 B1 * | 11/2002 | Pan et al. | 714/701 |
| 6,487,200 B1 * | 11/2002 | Fraser | 370/389 |
| 6,511,020 B2 | 1/2003 | Higgins | |
| 6,519,326 B1 * | 2/2003 | Milewski et al. | 379/67.1 |
| 6,526,581 B1 * | 2/2003 | Edison | 725/74 |
| 6,542,500 B1 * | 4/2003 | Gerszberg et al. | 370/354 |
| 6,574,237 B1 * | 6/2003 | Bullman et al. | 370/465 |
| 6,601,209 B1 * | 7/2003 | Lewis et al. | 714/756 |
| 6,725,372 B1 * | 4/2004 | Lewis et al. | 713/176 |
| 6,732,315 B2 * | 5/2004 | Yagil et al. | 714/755 |
| 6,868,072 B1 * | 3/2005 | Lin et al. | 370/276 |
| 6,941,576 B2 * | 9/2005 | Amit | 725/143 |
| 6,989,733 B2 * | 1/2006 | Simonsen et al. | 375/259 |
| 7,027,537 B1 * | 4/2006 | Cheong et al. | 375/348 |
| 7,127,734 B1 * | 10/2006 | Amit | 725/80 |

FOREIGN PATENT DOCUMENTS

| | | |
|---|---|---|
| WO | WO 99/04338 | 1/1999 |

OTHER PUBLICATIONS

Chan et al., "Performance Enhancement Using Forward Error Correction On Power Line Communication Channels," Apr. 1994, IEEE vol. 9, No. 2, pp. 645-653.

* cited by examiner

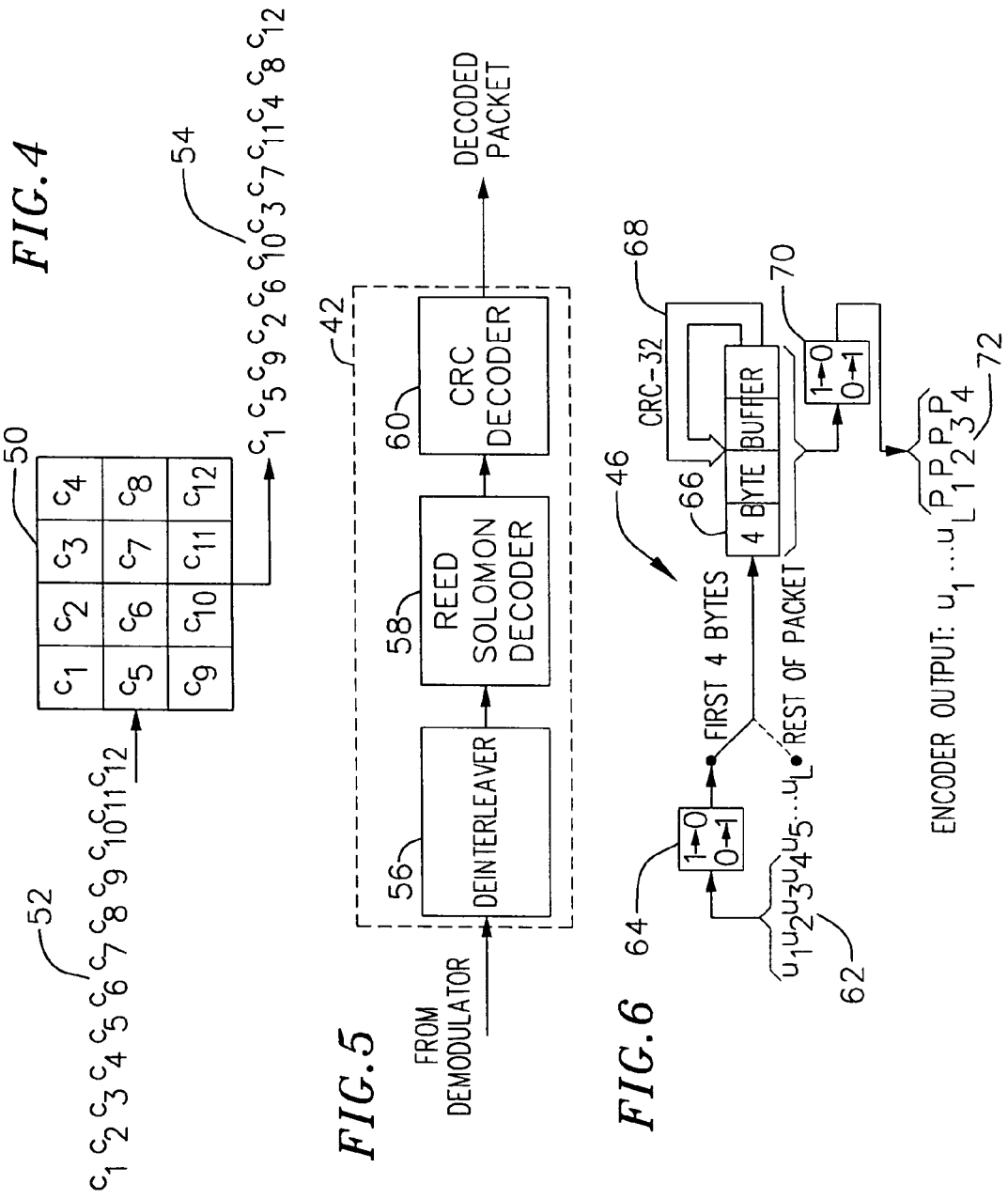

INTERLEAVED REED SOLOMON CODING FOR HOME NETWORKING

BACKGROUND OF THE INVENTION

The present invention relates to the field of data encoding and decoding, and in particular, data encoding/decoding for use in a home network communications system.

As computers become more and more cost effective for the everyday consumer and for small businesses, such computers become more plentiful for use within local area environments such as homes, office buildings and the like. For example, within a home a person with a computer in the bedroom, and another in the living room, may want to share common files, utilize a common digital subscriber line (DSL), or otherwise transfer information between the computers. Accordingly, various technologies are being developed for computer interconnection of multiple computers located within such environments. One example of such technologies are the Home Phoneline Network Alliance (HPNA) specifications for local area network (LAN) computer interconnection which utilize existing telephone lines within the local environment for the transmission of data packets between the computers. Another example is the use of existing power lines within the home as a transmission medium.

SUMMARY OF THE INVENTION

A method of transmitting and receiving data packets over a channel susceptible to random burst, and/or even additive white gaussian noise, channel errors is provided. Each data packet is encoded to form error correctable encoded data packets. Each error correctable encoded data packet is interleaved to form interleaved error correctable encoded data packets. Each interleaved error correctable encoded data packet is modulated to form modulated interleaved error correctable encoded data packets. Each modulated interleaved error correctable encoded data packet is transmitted over the channel. The channel can be a telephone line. The encoding includes performing Reed Solomon encoding on each data packet to form Reed Solomon error correctable encoded data packets. Each data packet is cyclic redundancy check encoded prior to performing Reed Solomon encoding. Modulated interleaved error correctable encoded data packets are received from the channel. Each modulated interleaved error correctable encoded data packet is demodulated to form demodulated interleaved error correctable encoded data packets. Each demodulated error correctable encoded data packet is deinterleaved to form deinterleaved demodulated error correctable encoded data packets. Each deinterleaved demodulated error correctable encoded data packet is decoded to extract each transmitted data packet. The decoding includes performing Reed Solomon decoding on each deinterleaved demodulated error correctable encoded data packet to form Reed Solomon decoded data packets. Each Reed Solomon decoded data packet is cyclic redundancy check decoded after performing Reed Solomon decoding.

A system for transmitting and receiving data packets over a channel susceptible to random burst and/or white gaussian noise channel errors is also provided. A transmitter and a receiver are coupled to the channel.

The transmitter includes:
an encoder for encoding each data packet to form error correctable encoded data packets;
an interleaver coupled to the encoder for interleaving each error correctable encoded data packet to form interleaved error correctable encoded data packets;
a modulator coupled to the interleaver for modulating each interleaved error correctable encoded data packet to form modulated interleaved error correctable encoded data packets.

The receiver includes:
a demodulator for receiving modulated interleaved error correctable encoded data packets from the channel and demodulating each modulated interleaved error correctable encoded data packet to form demodulated interleaved error correctable encoded data packets;
a deinterleaver coupled to the demodulator for deinterleaving each demodulated error correctable encoded data packet to form deinterleaved demodulated error correctable encoded data packets;
a decoder coupled to the deinterleaver for decoding each deinterleaved demodulated error correctable encoded data packet to extract each transmitted data packet.

DESCRIPTION OF THE DRAWINGS

FIG. 4 shows in block diagram form the operation of an interleaver in accordance with the present invention.

FIG. 5 shows in block diagram form an embodiment of an intrapacket decoder in accordance with the present invention.

FIG. 6 shows in block diagram form an embodiment of a CRC encoder in accordance with the present invention.

DETAILED DESCRIPTION OF THE INVENTION

Figure 1:
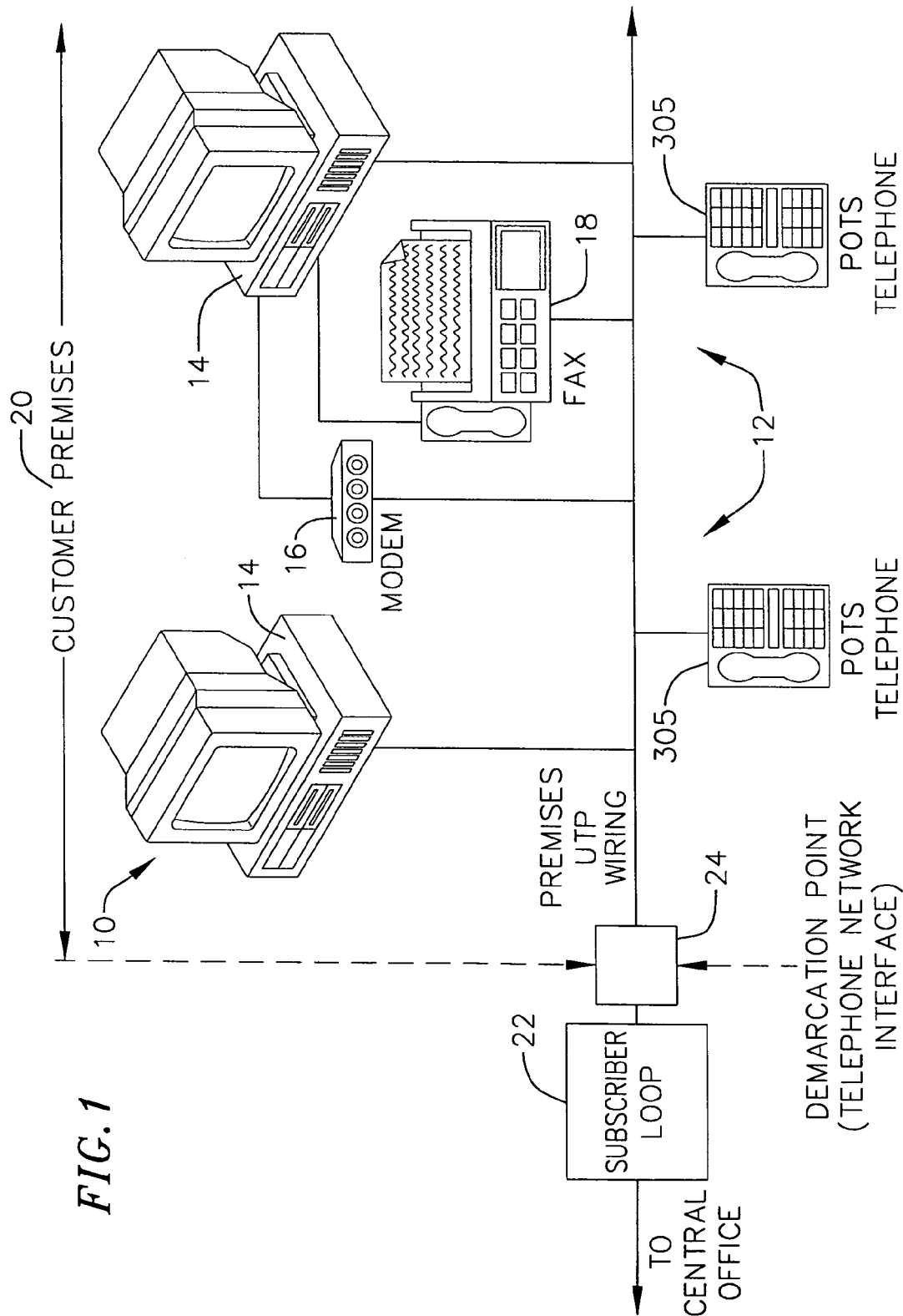
FIG. 1 shows in block diagram form a home networking environment within which the present invention can be implemented.

FIG. 1 depicts a typical home environment. Home network 10 includes existing (installed) plain old telephone service (POTS) wiring 12, network clients 14, the computer port side of modem 16 and fax 18. POTS wiring 12 provides wiring infrastructure used to network multiple clients at a customer premises (e.g., home) 20. POTS wiring 12 can be conventional unshielded twisted pair (UTP) wiring that is generally routed internally in the walls of the customer premises 20 to various locations (e.g., rooms) within the customer premises. Subscriber loop 22 (also called a "local loop") is a physical wiring link that directly connects an individual customer premises 20 to the Central Office through telephone network interface 24, a demarcation point between the inside and outside of customer premises 20.

Of particular importance for these networks are systems that provide communication between computers as reliably and with as high a data rate as possible. Such reliability necessitates combating the introduction of errors in data packets that are transmitted between computers. Such errors can arise from various electrical signals which can occur from electrical devices within the home, for example, impulse noise from a refrigerator, or from a phone ringing. These types of electrical appliances generate electrical signals which will couple into the UTP or whatever medium that is being used to transmit the data between the computers which are communicating. Such a ringing phone generates an electrical impulse signal which can corrupt a portion of the data packet being transmitted. Such errors are localized in time and corrupt a small segment of the data being transferred back and forth. These types of errors are generally referred to a "error bursts". Channels over which data is transmitted that have such errors are generally referred to as "bursty error channels". Further, even in channels where bursts are not received, distortions can occur from additive white gaussian noise.

While within the HPNA specifications there is provided a means for the system to adapt itself to changes in the channel when there is suddenly an increase in noise or there is some other disturbance that is causing gross changes in the wiring, however, such adaptation does take some time. Therefore, during the time period from when the channel changes occur until the computers catch up (adapt), there may be quite a few errors occurring.

Also, in accordance with the HPNA specifications, within the receiver there is a device called the decision feedback equalizer. It makes tentative decisions as to what bits were being sent and then tries to subtract out the sources of errors based upon the tentative decisions. However, in the case where the tentative decisions are not very good, the attempt to subtract out the errors tends to create further errors. In other words, it actually hurts the system rather than helping it.

Reiterating, these types of error events are ones that are generally localized in time, namely, they don't happen at a regular occurrence. Most of the time the transmission will be acceptable, but occasionally there can be a bunch of errors grouped together. At the rate at which these errors typically occur, the transmitted packets will see at most one error burst.

At present, the HPNA specifications do not use any error correcting code system. It uses a simple well-known cyclic redundancy check (CRC). In accordance with the CRC process a number is developed based upon the statistical computation on the bytes which are in the packet. At the receive end, if the number matches a preset number, there is a presumption that the number is correct and, therefore, that there are not any errors. If the number does not match, there is a presumption that there are errors. The receiver thereupon indicates that the packet should be discarded and requests that the transmitter resend the packet.

Therefore, a need exists for error correcting codes which can form part of the technologies being developed which utilize telephone wiring (or alternatively power line wiring) within the home or office. If error correcting codes in accordance with the present invention are implemented, fewer packets will have errors that require a retransmission of the packet. As such, more of the packets will arrive correctly at the receiver on the first try, and thereby result in a higher data rate, and, in turn, provide a net increase in system data throughput.

Figure 2:
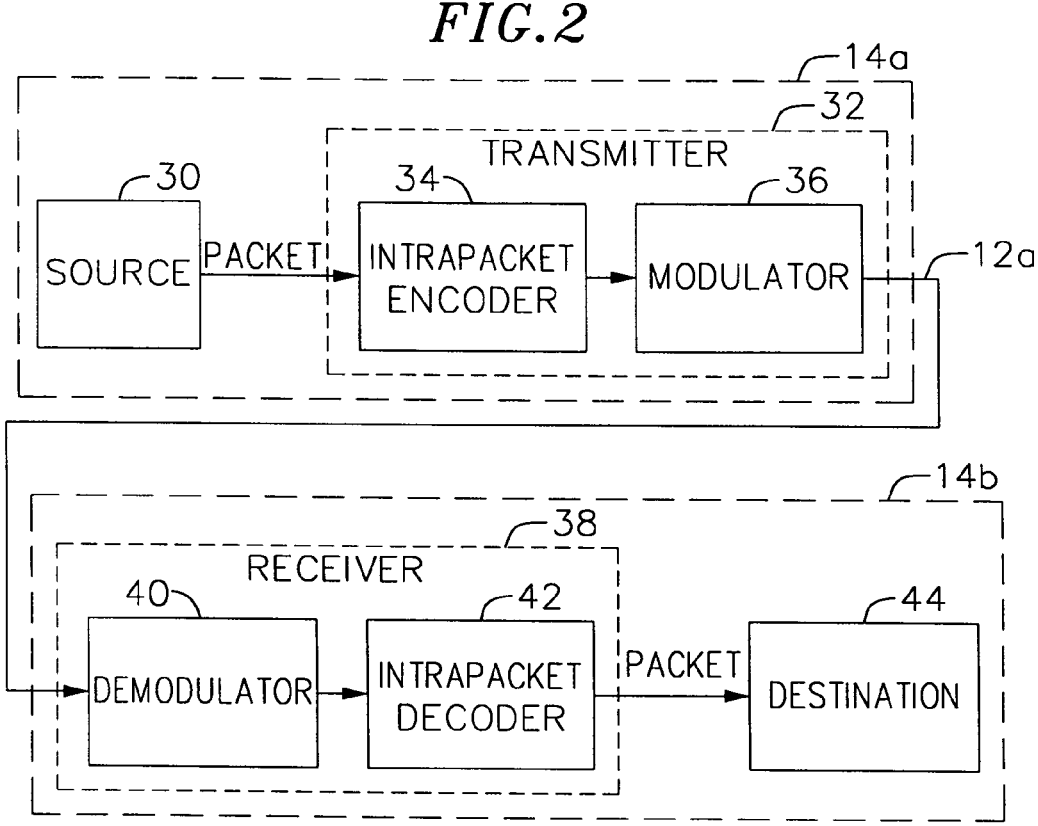
FIG. 2 shows in block diagram form an embodiment of the present invention.

Referring to FIG. 2, there is depicted in block diagram form an embodiment of the present invention wherein source computer 14a is desirous of communicating via a home networking protocol (e.g., HPNA specification versions 1.0 and 2.0) with destination computer 14b over a channel 12a. The environment in which the embodiment operates is similar to that depicted in FIG. 1. Source computer 14a wishes to send a packet(s) of data to destination computer 14b. Source computer 14a includes data source 30 and transmitter 32. Transmitter 32 is typically a chip residing on a board within source computer 14a. Transmitter 32 includes intrapacket encoder 34 and modulator 36. Intrapacket encoder 34 performs Reed Solomon encoding to help protect the packet from errors. Source 30 provides the data packet to intrapacket encoder 34, which encodes the packet, as described in more detail below. The encoded packet gets modulated by modulator 36 and gets sent over channel 12a to destination computer 14b. Destination computer 14b includes receiver 38. Receiver 38 has a demodulator 40 and intrapacket decoder 42. Demodulator 40 demodulates the received encoded packet in accordance with the home networking protocol modulation/demodulation implemented as set forth in the HPNA specification, namely, Quadrature Amplitude Modulation (QAM). The modulation uses constellation sizes from 4 QAM up to 256 QAM. Intrapacket decoder 42 receives the demodulated encoded packet, decodes the encoded packet and provides a correct packet of bytes to packet destination 44. The modulation/demodulation/transmission/reception are as provided by the commercially available Broadcom Model No. 4210 HomeNetworking Controller chip.

Figure 3:
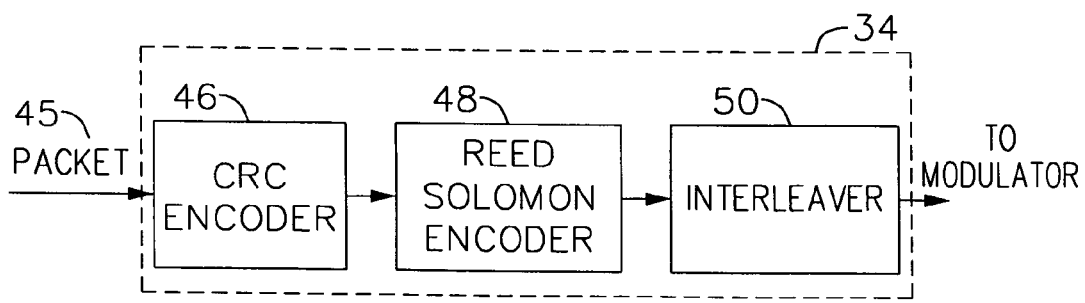
FIG. 3 shows in block diagram form an embodiment of an intrapacket encoder in accordance with the present invention.

Referring to FIG. 3, intrapacket encoder 34 is depicted in block diagram form. Intrapacket encoder 34 includes CRC encoder 46, Reed Solomon encoder 48 and interleaver 50. A packet 45 arriving at intrapacket encoder 34 is encoded by CRC encoder 46 in the manner briefly described above, adding bytes so that the receiver can later detect whether the packet is error free or not. Since the destination computer does not have any knowledge as to what is being sent by the source computer, the destination computer needs this mechanism to determine if the data received is real data or not. After the bytes get added by CRC encoder 46, the packet gets passed on to Reed Solomon encoder 48. Reed Solomon encoder 48 adds redundancy to protect against packet errors. The added redundancy is provided by the well-known Reed Solomon process, allowing the receiver to correct certain types of errors which will occur in the packet being transmitted. The added redundancy packet is then passed on to interleaver 50. Interleaver 50 reorders the bytes to protect them against burst errors. As such, when an error burst occurs it won't affect the same group of bytes that the Reed Solomon encoder outputs, but will be dispersed over a number of bytes.

Still referring to FIG. 3, CRC encoder 46 takes in a packet of the information bytes and runs through a computation which generates a series of check sum bytes for error detection use at the receiver. This process provides a good indication at the receiver as to whether the packet is error-free with little added redundancy. At the receiver, the same computation is performed and the check sum bytes seen at the decoder in the receiver are examined to determine if they match the check sum bytes added by CRC encoder 46. If the check sum bytes match, such indicates that the packet is good, that is, it's error-free and useable by the destination computer. Otherwise, if the check sum bytes do not match, such indicates that the packet is not good, and that a retransmission is needed. The operation of CRC encoder 46, which is currently implemented pursuant to the HPNA specifications via software encoding, is described in further detail below.

Still referring to FIG. 3, Reed Solomon encoder 48 implements a well-known class of error correcting codes wherein a block of bytes from within the packet are taken and from which a set of parity bytes is computed. These parity bytes are added on to the packet, giving added redundancy to protect the packet against errors which may occur over the transmission channel. Encoding is performed within each packet. The encoding is not stretched across multiple packets. In other words, each packet is encoded as its own entity. One of the parameters associated with the Reed Solomon encoding is the Galois field size. Galois field size involves math theory and abstract algebra concepts as to how to manipulate these bytes, that is, the various symbols within a Reed Solomon codeword. The number of bits are specified which correspond to a coordinate of the code word. In accordance with the present invention Galois field 256, GF(256), is chosen, wherein each byte is a coordinate of the codeword. This Galois field size provides the convenience of having computations based on byte boundaries. Each byte is a coordinate of a codeword and the modulation scheme utilizes constellation sizes from QPSK, which requires two bits per element, up to 256 QAM, which requires one byte per element. As such, each byte will contain at least one symbol which will go out onto the channel. Therefore, an error burst which affects multiple channel symbols will only affect a small number of bytes. For example, if there is a transmission of two bits per channel symbol, and the burst error affects four channel symbols, the burst error will be confined to one byte. By having a large Galois field size there is provided the advantage of "trapping" the bursts which occur in the channel to a very small fraction of the codeword, i.e., within a few codeword coordinates, allowing it to be easily correctable. This choice of Galois field size allows an efficient implementation in software and an efficient use of memory.

As part of the Reed Solomon encoding process, the code rate and codeword size are determined. The code rate is the division of the number of information coordinates by the number of codeword coordinates. Given the rate at which errors are expected to be seen in the channel, the Reed Solomon code rate can be 4/5 to 8/9. The codeword size is the number of bytes which constitute a codeword. Reed Solomon codewords are naturally defined such that the codeword size is one less than the Galois field size. As such, when using GF(256), the corresponding Reed Solomon codeword would normally be 255 bytes long. However, in accordance with the present invention, the Reed Solomon codeword size can be reduced, for example to 40 bytes, without sacrificing code rate, resulting in a decreased decoder complexity. Further, systematic encoding is implemented by Reed Solomon encoder 48, wherein the series of bytes which come in don't get changed, but merely additional bytes are computed which get appended to the end of the packet being encoded, providing the added redundancy. As such, additional computation is not needed on the bytes which come in. The Reed Solomon encoding is implemented in C language as part of driver software for the Broadcom Model No. 4210 HomeNetworking Controller chip.

Referring to FIGS. 3 and 4, interleaver 50 is described. Interleaver 50 reorders bytes within a packet after encoding to protect it against burst errors. In FIG. 4, there is depicted an example of a 3×4 interleaver. Byte stream sequence 52 from Reed Solomon encoder 48 is shown entering interleaver 50 in order. Interleaver 50 is in essence a memory buffer wherein the bytes are read in by rows, for example, bytes $c1$, $c2$, $c3$, $c4$ being read into the first row; bytes $c5$, $c6$, $c7$, $c8$ being read into the second row; and bytes $c9$, $c10$, $c11$, $c12$ being read into the third row. Interleaver 50 then outputs, as read out by columns, reordered byte stream sequence 54. The size of interleaver 50 is chosen such that the number of columns is equal to the codeword size and the number of rows is equal to the maximum size of the packet that can be handled. A smaller than maximum packet will accordingly not fill all the rows.

Referring to FIG. 5, intrapacket decoder 42 is shown in more detail. Intrapacket decoder 48 includes deinterleaver 56, Reed Solomon decoder 58 and CRC decoder 60. Coming in from demodulator 40, the bytes are deinterleaved by deinterleaver 56 so that the bytes are reordered in the proper order for the Reed Solomon decoding that follows. Reed Solomon decoder 58 corrects errors that have occurred within the packet. CRC decoder 60 performs computations on the bytes of the packet in order to determine whether or not the packet was error-free.

Still referring to FIG. 5, deinterleaver 56 is discussed in more detail. Deinterleaver 56 is in essence the inverse of interleaver 50 described above. Deinterleaver 56 disperses corrupted bytes over many codewords. That is, when there is a number of bytes clumped together which have errors in them, after being processed by the deinterleaver, the bytes with errors in them are dispersed throughout the entire packet because they are going to be reordered and spread apart. Rather than requiring Reed Solomon decoder 58 to be able decode one localized burst, the decoder will see much more random errors and fewer errors per codeword block. As such, this aspect reduces required error correction strength of the Reed Solomon decoder and, as a result, its complexity. The same structure that is used in the interleaver is used, but in reverse, namely, with data read in as columns and read out as rows.

With regard to Reed Solomon decoder 58, it corrects a number of errors up to half the number of parity bytes per block, that is, half the number of bytes of redundancy added per block. As can be seen, with the combination of Reed Solomon encoding and interleaving, a burst error is dispersed over many codewords and a less powerful code is needed to correct all the errors within the packet. Similar to the encoder, the decoder is implemented in C language as part of the software driver for the Broadcom Model No. 4210 HomeNetworking chip set.

The Reed Solomon decoder implements the basic steps implementing a typical Reed Solomon decoding algorithm. Error coordinates need to be located within a codeword, that is, determining which bytes within a codeword are in error. Syndromes are first computed, which are quantities computed from receive coordinates and prove helpful in the algorithm process. The error locator polynomial is then constructed using the well-known Berlekamp Massey algorithm, which gives a quantity that is passed on to the next step, namely, performing a Chien search. The Chien search determines which bytes within a codeword had an error. Once it is determined which bytes were in error, the magnitude of the error is then determined, so that the error can be corrected (subtracted off), for example, by an algorithm developed by Forney. Once the corrections are made to the codeword, the redundant bytes (parity bytes added in at the encoder) are removed.

Still referring to FIG. 5, CRC decoder 60 runs a computation on the packet it receives in order to determine whether or not it has errors. It then compares the result of the computation with the last few bytes of the packet, and if there is a match, the packet is error-free and can be used by the destination computer. If it doesn't match, the packet is indicated as being invalid and that a valid packet needs to be resent.

With the combination of the Reed Solomon encoding and interleaving, the amount of time that good packets are seen at the CRC decoder increases and the need for packet retransmissions is reduced. Such will thereby improve the overall throughput of the entire system.

Figure 7:
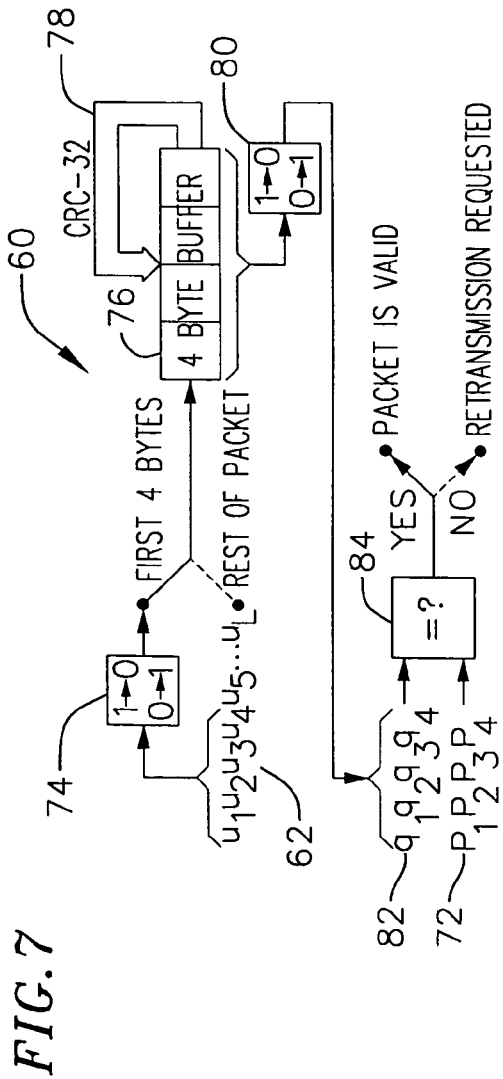
FIG. 7 shows in block diagram form an embodiment of a CRC decoder in accordance with the present invention.

Referring now to FIGS. 6 and 7 CRC encoder 46 and its counterpart CRC decoder 60 are described in more detail. Referring to FIG. 6, CRC encoder 46 utilizes the standard CRC-32 encoder typically implemented in Ethernet and compression algorithm systems. It provides a relatively straightforward way to add some minimal redundancy to the transmitted data to determine whether there are any errors at the receiver. As an operational example, consider packet 62 containing L bytes u1, u2, . . . uL to be encoded. The first four bytes u1, u2, u3, u4 have the bits within them complemented by inverter 64, namely bits that are 0 become 1 and bits that are 1 become 0. This is undertaken because the CRC encoder is unable to detect a leading run of 0s, that is, it is unable to tell whether there is one 0 or a long string of 0s. Accordingly, the complementing is performed to start the encoder in a situation where it would see a string of 0s at the outset. The complemented bytes, along with the rest of the packet are loaded into buffer 66 while feeding back a generator polynomial, as indicated by numeral 68, a procedure which performs a mathematical computation on the bytes. As one byte at a time is cycled through buffer 66, the contents of the buffer, a four byte buffer for example, are constantly changing based on the bytes that come into the buffer and the computation performed thereon by the CRC-32 feedback polynomial. Once the end of the packet is reached, inverter 70 performs another complementing. The four byte buffer contents as complemented will be taken as parity bytes to be associated with the packet. These four parity bytes 72 will be a unique four byte check sum element for the packet and are concatenated at the end of the packet.

Referring to FIG. 7, corresponding CRC decoder 60 is described in more detail. CRC decoder 60 is implemented in a very similar fashion to that of CRC encoder 46. The last four bytes are not concerned with at first. The other L bytes of the sequence u1, u2, . . . ul sequence 62 are re-encoded in the same way as at encoder 46. That is, the first four bytes u1, u2, u3, u4 have the bits within them complemented by inverter 74, namely bits that are 0 become 1 and bits that are 1 become 0. The complemented bytes, along with the rest of the packet are loaded into buffer 76 while feeding back a generator polynomial, as indicated by numeral 78, a similar CRC-32 mathematical computation procedure performed on the bytes. As one byte at a time is cycled through buffer 76, the contents of the similar four byte buffer constantly change based on the bytes that come into the buffer and the computation performed thereon by the CRC-32 feedback polynomial. Once the end of the packet is reached, inverter 80 performs another complementing function resulting in bytes 82. When a comparison is made at comparator 84 between bytes 82 and bytes 72, if these bytes match the packet is considered valid. If these bytes do not match, a error is indicated and a retransmission of the packet is requested from the transmitter by a standard feedback acknowledgment process.

Figure 8:
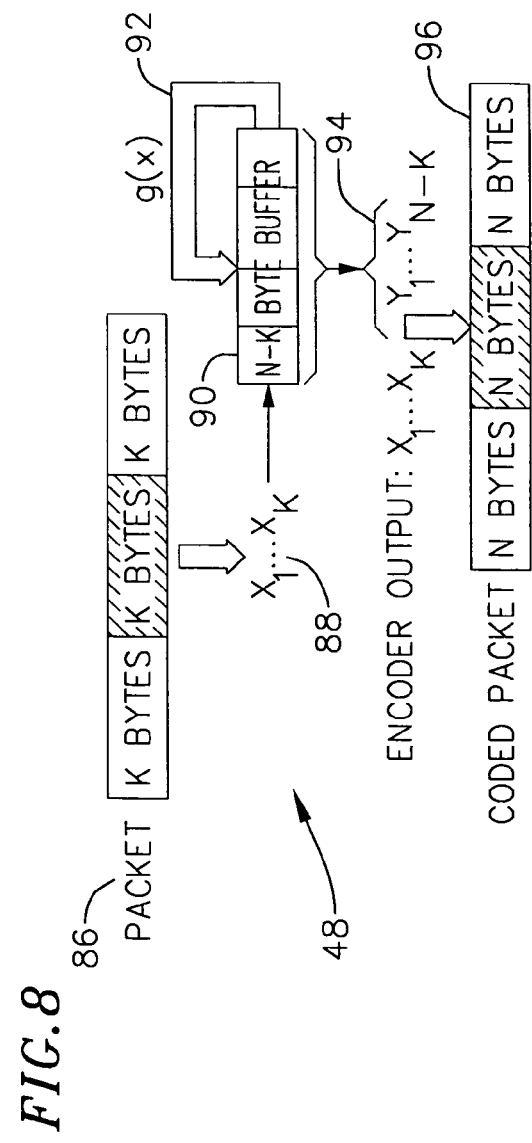
FIG. 8 shows in block diagram form an embodiment of a Reed Solomon encoder in accordance with the present invention.
Figure 9:
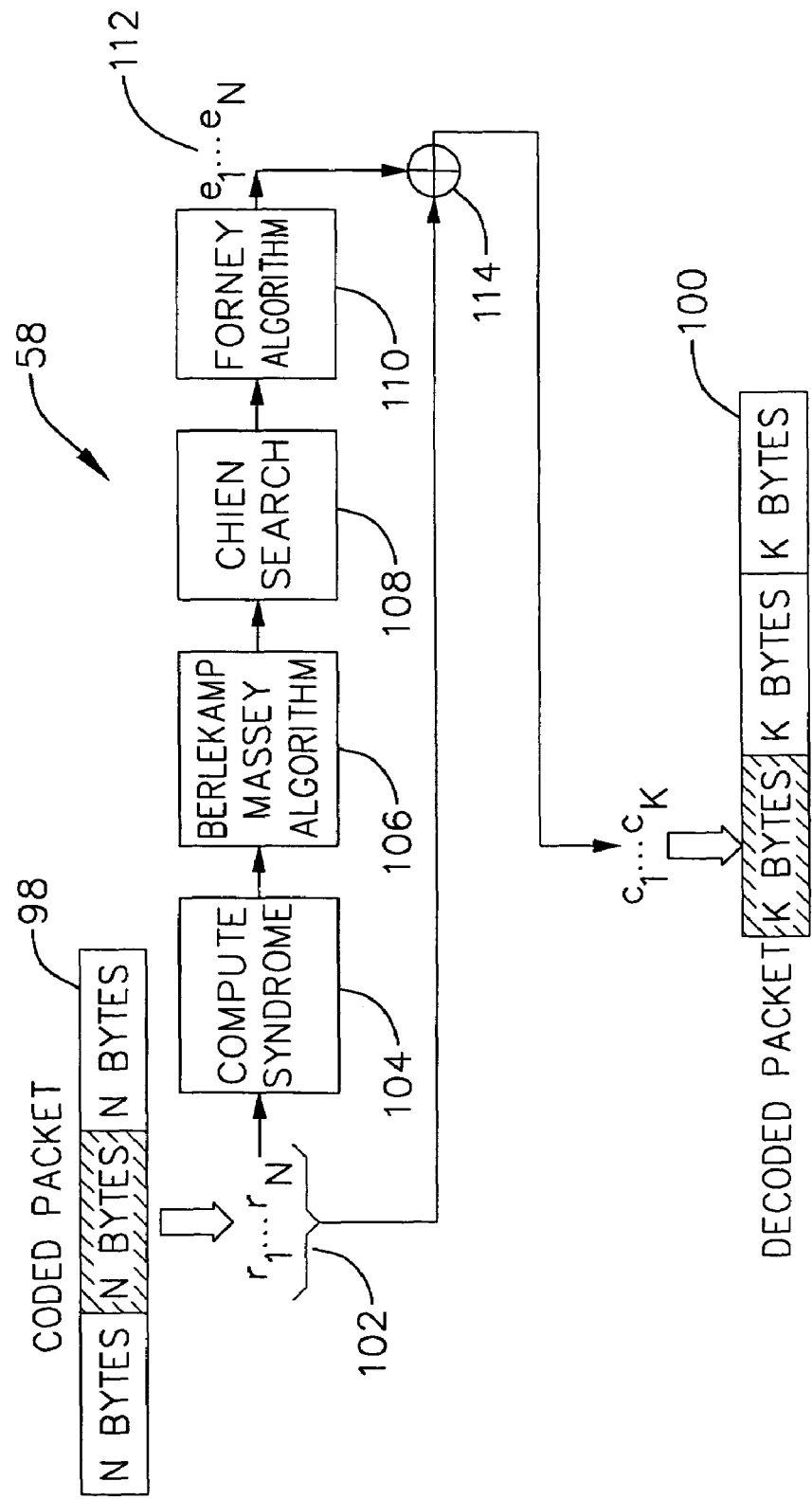
FIG. 9 shows in block diagram form an embodiment of a Reed Solomon decoder in accordance with the present invention.

Referring now to FIGS. 8 and 9 Reed Solomon encoder 48 and its counterpart Reed Solomon decoder 58 are described in more detail. Referring to FIG. 8, consider packet 86 to be processed. Encoder 48 breaks packet 86 into K byte blocks, where K is a parameter associated with the Reed Solomon encoder. Redundancy is then added to the K bytes and expands them into N byte segments of the packet. For example, typical values for N and K can be N=40 and K=32, providing, for example, a 4/5 code rate, as was previously described. For one segment of the packet X1 . . . Xk bytes 88 are fed into N-K byte buffer 90. Computations are then performed on the bytes through feedback polynomial g(x), as indicated by numeral 92, a known generator polynomial for the Reed Solomon code. The computation provides a series 94 of N–K redundancy bytes y1 . . . yn–k. The N–K bytes are appended at the end of the K bytes X1 . . . Xk. As such, there is provided a coded packet 96, having a series of N byte segments. In the event that the packet does not end on a K byte boundary, the end of the packet has 0s added to complete the full block up to the boundary. The encoding is then done over Galois field 256. It should be noted that this encoding is a systematic implementation, wherein the X1 . . . Xk bytes pass through without being modified and, as such, the Y1 . . . Yn-k are only calculated. This allows the data that came into the encoder to be provided directly at the output of the encoder. The systematic coding is helpful in reducing the number of operations performed both a the encoder and at the decoder.

Referring to FIG. 9, corresponding Reed Solomon decoder 58 is described in more detail. Decoder 58 performs the inverse operation of encoder 48. Coded packet 98 having groups of N bytes received at decoder 58 have a computation performed on them to obtain decoded packet 100 having groups of K bytes. Given the N bytes that are received, the decoding will attempt to compute the K bytes which most likely led to the N bytes. Received bytes 102 r1 . . . rn are taken wherein syndromes are computed, as indicated by block 104. The syndromes are intermediate parameters in the decoding algorithm which will be helpful in the later stages of the processing. After the syndromes are computed, the Berlekamp Massey algorithm is applied, as indicated by block 106, generating an error locator polynomial. This polynomial, a mathematical construct, has as its root values 1 through N, which represent the locations of the errors within the N byte block. A Chien search, as indicated by block 108, is then performed. A cycling through all possible values of 1 through N is undertaken in order to determine what the roots are of the error locator polynomial and thereby determine the actual error location. Once the error location is determined, the error magnitude is then determined, so that the errors can be subtracted off and the original K bytes recovered. The standard Forney algorithm, as indicated by block 110, is then performed to compute the error magnitude. Once the error magnitude and locations are determined, error event polynomial 112 e1 . . . en is generated. When the error event polynomial is combined with the received bytes, as indicated by block 114, a valid N byte Reed Solomon codeword will be produced. From the N bytes the K bytes are extracted and concatenated and then passed on to the CRC decoder in the next stage of the decoding process.

In essence, as set forth above, in accordance with the present invention, error correction encoding has been applied to packets involved in home networking transmission to protect the packet transmission from errors that are incurred in home networking channels. Reed Solomon encoding used in conjunction with interleaving helps avoid an impact on the packet transmission resulting from home networking channel transmission errors of a bursty nature which can randomly affect bunches of bytes in a row. The present invention provides a significant improvement in error correction based upon these types of errors.

It should be noted, that in accordance with the present invention, rather than implementing the encoding and the decoding algorithms in hardware, the encoding and interleaving can be performed in software as part of the software driver for existing commercially available HPNA specification implemented chip sets, such as the Broadcom Model No. BCM 4210 chip set. This software implementation would not require modification of existing hardware and is distinct from other interleaved Reed Solomon encoding systems (such as those typically found in the compact disc audio system) which perform the operations in hardware. Such a software implementation does not impede the performance of the computers which implement current HPNA specification versions 1.0 and 2.0. The central processing unit (CPU) processing power needed to encode, decode, and interleave can be less than 50 percent of the total processing power.

Those skilled in the art can appreciate that, while one embodiment of the present invention has been described, various alternatives can be utilized to practice the invention.

For example, different parameters for N and K, different Reed Solomon polynomials, non-systematic rather than systematic encoding, different types of interleavers, all can be chosen rather than the aspects set forth in the embodiments described herein.

The invention claimed is:

1. A method of transmitting non-telephone data packets over a non-dedicated local area network channel provided by a telephone line between a first node and a second node, the method comprising:

encoding each non-telephone data packet to form error correctable encoded non-telephone data packets;

interleaving each error correctable encoded non-telephone data packet to form interleaved error correctable encoded non-telephone data packets;

modulating each interleaved error correctable encoded non-telephone data packet to form modulated interleaved error correctable encoded non-telephone data packets;

transmitting, from the first node, each modulated interleaved error correctable encoded non-telephone data packet over the non-dedicated local area network channel provided by the telephone line; and receiving, by the second node, each modulated interleaved error correctable encoded on-telephone data packet transmit over the non-dedicated local area network channel provided by the telephone line.

2. The method of claim 1, wherein the encoding includes performing Reed Solomon encoding on each non-telephone data packet to form Reed Solomon error correctable encoded non-telephone packets.

3. The method of claim 2, wherein each non-telephone data packet is cyclic redundancy check encoded prior to performing Reed Solomon encoding.

4. The method of claim 1, wherein the step of interleaving includes writing each error correctable encoded non-telephone data packet into an array row-by-row and reading an interleaved error correctable encoded non-telephone data packet out of the array column-by-column.

5. The method of claim 4, wherein the array has a number of columns which is equal to a size of a codeword of the error correctable encoded non-telephone data packets.

6. The method of claim 4, wherein the array has a number of rows equal to the maximum size non-telephone data packet to be handled.

7. The method of claim 1, wherein each modulated interleaved error correctable encoded non-telephone data packet is transmitted over the non-dedicated local area network channel in accordance with Home Phoneline Network Alliance (HPNA) protocols.

8. A method of receiving transmitted non-telephone data packets from a non-dedicated local area network channel provided by a telephone line, the method comprising:

receiving modulated interleaved error correctable encoded non-telephone data packets from the non-dedicated local area network channel provided by the telephone line;

demodulating each modulated interleaved error correctable encoded non-telephone data packet to form demodulated interleaved error correctable encoded non-telephone data packets;

deinterleaving each demodulated error correctable encoded non-telephone data packet to form deinterleaved demodulated error correctable encoded non-telephone data packets; and decoding each deinterleaved demodulated error correctable encoded non-telephone data packet to extract each transmitted non-telephone data packet.

9. The method of claim 8, wherein the decoding includes performing Reed Solomon decoding on each deinterleaved demodulated error correctable encoded non-telephone data packet to form Reed Solomon decoded non-telephone data packets.

10. The method of claim 9, wherein each Reed Solomon decoded non-telephone data packet is cyclic redundancy check decoded after performing Reed Solomon decoding.

11. The method of claim 8, wherein the step of deinterleaving includes writing each demodulated error correctable encoded non-telephone data packet into an array column-by-column and reading a deinterleaved demodulated error correctable encoded non-telephone data packet out of the array row-by-row.

12. The method of claim 11, wherein the array has a number of columns which is equal to a size of a codeword of the deinterleaved demodulated error correctable encoded non-telephone data packets.

13. The method of claim 11, wherein the array has a number of rows equal to the maximum size non-telephone data packet to be handled.

14. The method of claim 8, wherein each modulated interleaved error correctable encoded non-telephone data packet is received over the non-dedicated local area network channel in accordance with Home Phoneline Network Alliance (HPNA) protocols.

15. A system for transmitting and receiving non-telephone data packets over a non-dedicated local area network channel provided by a telephone line, the system comprising:

a transmitter, coupled to the non-dedicated local area network channel provided by the telephone line; and a receiver coupled to the non-dedicated local area network channel provided by the telephone line;

wherein the transmitter includes:

an encoder for encoding each non-telephone data packet to form error correctable encoded non-telephone data packets;

an interleaver coupled to the encoder for interleaving each error correctable encoded non-telephone data packet to form interleaved error correctable encoded on-telephone data packets;

a modulator coupled to the interleaver for modulating each interleaved error correctable encoded non-telephone data packet to form modulated interleaved error correctable encoded non-telephone data packets; and wherein the receiver includes:

a demodulator for receiving modulated interleaved error correctable encoded non-telephone data packets from the non-dedicated local area network channel provided by the telephone line and demodulating each modulated interleaved error correctable encoded non-telephone data packet to form demodulated interleaved error correctable encoded non-telephone data packets;

a deinterleaver coupled to the demodulator for deinterleaving each demodulated error correctable encoded non-telephone data packet to form deinterleaved demodulated error correctable encoded on-telephone data packets;

a decoder coupled to the deinterleaver for decoding each deinterleaved demodulated error correctable encoded non-telephone data packet to extract each transmitted non-telephone data packet.

16. The system of claim 15, wherein the encoder includes a Reed Solomon encoder for encoding each non-telephone data packet to form Reed Solomon error correctable encoded non-telephone data packets.

17. The system of claim 16, wherein the encoder includes a cyclic redundancy check encoder for cyclic redundancy check encoding the non-telephone data packet prior to performing Reed Solomon encoding.

18. The system of claim 15, wherein the decoder includes Reed Solomon decoder for performing Reed Solomon decoding on each deinterleaved demodulated error correctable encoded non-telephone data packet to form Reed Solomon decoded non-telephone data packets.

19. The system of claim 18, wherein the decoder includes a cyclic redundancy check decoder for performing cyclic redundancy check decoding after performing Reed Solomon decoding.

20. The system of claim 15, wherein the interleaver of the transmitter includes an array, wherein each error correctable encoded non-telephone data packet is read into the array row-by-row, and each interleaved error correctable encoded non-telephone data packet is read out column-by-column.

21. The system of claim 20, wherein the array has a number of columns equal to the size of a codeword of the error correctable encoded non-telephone data packet.

22. The system of claim 20, wherein the array has a number of rows equal to a size of the error correctable non-telephone data packet.

23. The system of claim 15, wherein the deinterleaver of the receiver includes an array, wherein each demodulated error correctable encoded non-telephone data packet is read into the array column-by-column, and each deinterleaved demodulated error correctable encoded non-telephone data packet is read out of the array row-by-row.

24. The system of claim 15, wherein each modulated interleaved error correctable encoded non-telephone data packet is transmitted and received over the non-dedicated local area network channel in accordance with Home Phoneline Network Alliance (HPNA) protocols.

25. A method of transmitting non-telephone data packets over a customer premises telephone line, the method comprising:
   coupling to the customer premises telephone line a source computer for transmitting the non-telephone data packets to a destination computer also coupled to the customer premises telephone line;
   encoding each non-telephone data packet to form error correctable encoded non-telephone data packets;
   interleaving each error correctable encoded non-telephone data packet to form interleaved error correctable encoded non-telephone data packets;
   modulating each interleaved error correctable encoded non-telephone data packet to form modulated interleaved error correctable encoded non-telephone data packets; and
   transmitting each modulated interleaved error correctable encoded non-telephone data packet over the customer premises telephone line to the destination computer.

26. The method of claim 25, wherein the encoding includes performing Reed Solomon encoding on each non-telephone data packet to form Reed Solomon error correctable encoded non-telephone data packets.

27. The method of claim 26, wherein each non-telephone data packet is cyclic redundancy check encoded prior to performing Reed Solomon encoding.

28. The method of claim 25, wherein the step of interleaving includes writing each error correctable encoded non-telephone data packet into an array row-by-row and reading an interleaved error correctable encoded non-telephone data packet out of the array column-by-column.

29. The method of claim 28, wherein the array has a number of columns which is equal to a size of a codeword of the error correctable encoded non-telephone data packets.

30. The method of claim 28, wherein the array has a number of rows equal to the maximum size non-telephone data packet to be handled.

31. The method of claim 25, wherein each modulated interleaved error correctable encoded non-telephone data packet is transmitted over the customer premises telephone line in accordance with Home Phoneline Network Alliance (HPNA) protocols.

32. A method of receiving transmitted non-telephone data packets from a customer premises telephone line, the method comprising:
   coupling to the customer premises telephone line a destination computer for receiving the non-telephone data packets from a source computer also coupled to the customer premises telephone line;
   receiving modulated interleaved error correctable encoded non-telephone data packets from the customer premises telephone line;
   demodulating each modulated interleaved error correctable encoded non-telephone data packet to form demodulated interleaved error correctable encoded non-telephone data packets;
   deinterleaving each demodulated error correctable encoded non-telephone data packet to form deinterleaved demodulated error correctable encoded non-telephone data packets; and
   decoding each deinterleaved demodulated error correctable encoded non-telephone data packet to extract each transmitted non-telephone data packet.

33. The method of claim 32, wherein the decoding includes performing Reed Solomon decoding on each deinterleaved demodulated error correctable encoded non-telephone data packet to form Reed Solomon decoded non-telephone data packets.

34. The method of claim 33, wherein each Reed Solomon decoded non-telephone data packet is cyclic redundancy check decoded after performing Reed Solomon decoding.

35. The method of claim 32, wherein the step of deinterleaving includes writing each demodulated error correctable encoded non-telephone data packet into an array column-by-column and reading a deinterleaved demodulated error correctable encoded non-telephone data packet out of the array row-by-row.

36. The method of claim 35, wherein the array has a number of columns which is equal to a size of a codeword of the deinterleaved demodulated error correctable encoded non-telephone data packets.

37. The method of claim 35, wherein the array has a number of rows equal to the maximum size non-telephone data packet to be handled.

38. The method of claim 32, wherein each modulated interleaved error correctable encoded non-telephone data packet is received over the customer premises telephone line in accordance with Home Phoneline Network Alliance (HPNA) protocols.

39. A system for transmitting and receiving non-telephone data packets over a customer premises telephone line, the system comprising:
   a source computer, coupled to the customer premises telephone line; and a destination computer coupled to the customer premises telephone line;

wherein the source computer includes:
- a transmitter for transmitting the non-telephone data packets to a destination computer also coupled to the customer premises telephone line;
- an encoder for encoding each non-telephone data packet to form error correctable encoded non-telephone data packets;
- an interleaver coupled to the encoder for interleaving each error correctable encoded non-telephone data packet to form interleaved error correctable encoded non-telephone data packets;
- a modulator coupled to the interleaver for modulating each interleaver error correctable encoded non-telephone data packet to form modulated interleaved error correctable encoded non-telephone data packets; and wherein the destination computer includes:
- a receiver for receiving the non-telephone data packets from a source computer also coupled to the customer premises telephone line;
- a demodulator for receiving modulated interleaved error correctable encoded non-telephone data packets from the customer premises telephone line and demodulating each modulated interleaved error correctable encoded non-telephone data packet to form demodulated interleaved error correctable encoded non-telephone data packets;
- a deinterleaver coupled to the demodulator for deinterleaving each demodulated error correctable encoded non-telephone data packet to form deinterleaved demodulated error correctable encoded non-telephone data packets;
- a decoder coupled to the deinterleaver for decoding each deinterleaved demodulated error correctable encoded non-telephone data packet to extract each transmitted non-telephone data packet.

40. The system of claim 39, wherein the encoder includes a Reed Solomon encoder for encoding each non-telephone data packet to form Reed Solomon error correctable encoded non-telephone data packets.

41. The system of claim 40, wherein the encoder includes a cyclic redundancy check encoder for cyclic redundancy check encoding the non-telephone data packet prior to performing Reed Solomon encoding.

42. The system of claim 39, wherein the decoder includes a Reed Solomon decoder for performing Reed Solomon decoding on each deinterleaved demodulated error correctable encoded non-telephone data packet to form Reed Solomon decoded non-telephone data packets.

43. The system of claim 42, wherein the decoder includes a cyclic redundancy check decoder for performing cyclic redundancy check decoding after performing Reed Solomon decoding.

44. The system of claim 39, wherein the interleaver of the transmitter includes an array, wherein each error correctable encoded non-telephone data packet is read into the array row-by-row, and each interleaved error correctable encoded non-telephone data packet is read out column-by-column.

45. The system of claim 44, wherein the array has a number of columns equal to a size of a codeword of the error correctable encoded non-telephone data packet.

46. The system of claim 44, wherein the array has a number of rows equal to a size of the error correctable non-telephone data packet.

47. The system of claim 39 wherein the deinterleaver of the receiver includes an array, wherein each demodulated error correctable encoded non-telephone data packet is read into the array column-by-column, and each deinterleaved demodulated error correctable encoded non-telephone data packet is read out of the array row-by-row.

48. The system of claim 39, wherein each modulated interleaved error correctable encoded non-telephone data packet is transmitted and received over the customer premises telephone line in accordance with Home Phoneline Network Alliance (HPNA) protocols.

49. A transmitter coupled to a non-dedicated local area network channel provided by a telephone line for transmitting non-telephone data packets over the channel provided by the telephone line, the transmitter comprising:
- an encoder for encoding each non-telephone data packet to form encoded non-telephone data packets;
- an interleaver coupled to the encoder for interleaving each encoded non-telephone data packet to form interleaved encoded non-telephone data packets; and
- a modulator coupled to the interleaver for modulating each interleaved encoded non-telephone data packet to form modulated interleaved encoded non-telephone data packets that are transmitted over the non-dedicated local area network channel provided by the telephone line.

50. A receiver coupled to a non-dedicated local area network channel provided by a telephone line for receiving modulated interleaved encoded non-telephone data packets from the channel provided by the telephone line, the receiver comprising:
- a demodulator for receiving modulated interleaved encoded non-telephone data packets from the non-dedicated local area network channel provided by the telephone line and demodulating each modulated interleaved encoded non-telephone data packet to form demodulated interleaved encoded non-telephone data packets;
- a deinterleaver coupled to the demodulator for deinterleaving each demodulated interleaved encoded non-telephone data packet to form deinterleaved demodulated encoded non-telephone data packets; and
- a decoder coupled to the deinterleaver for decoding each deinterleaved demodulated encoded non-telephone data packet to extract a non-telephone data packet.

51. A communications circuit for use with a computer for transmitting non-telephone data packets over a non-dedicated local area network channel provided by a telephone line, the circuit comprising:
- an intrapacket encoder residing on a board within the computer for encoding interleaving non-telephone data packets to produce encoded interleaved non-telephone data packets; and
- a controller chip residing on a board within the computer and coupled to a non-dedicated local area network channel provided by the telephone line;
- wherein the controller chip receives encoded interleaved non-telephone data packets from the intrapacket encoder; and
- wherein the controller chip modulates the received encoded interleaved non-telephone data packets to produce modulated encoded interleaved non-telephone data packets and transmits these packets over the non-dedicated local area network channel provided by the telephone line.

52. A communications circuit for use with a computer for receiving modulated encoded interleaved non-telephone data packets from a non-dedicated local area network channel provided by a telephone line and processing these packets, the circuit comprising:

a controller chip residing on a board within the computer and coupled to the non-dedicated local area network channel provided by the telephone line, the controller chip receiving the modulated encoded interleaved non-telephone data packets from the non-dedicated local area network channel provided by the telephone line and demodulating these packets to produce encoded interleaved non-telephone data packets;

an intrapacket decoder residing on a board within the computer;

wherein the intrapacket decoder receives, decodes and deinterleaves encoded interleaved non-telephone data packets sent from the controller chip to extract a non-telephone data packet.

53. The communications circuit of claim 52, wherein the intrapacket decoder performs cyclic redundancy check decoding and Reed Solomon decoding on the encoded interleaved non-telephone data packets in software as part of a software driver for a chip set.

* * * * *

UNITED STATES PATENT AND TRADEMARK OFFICE
CERTIFICATE OF CORRECTION

| | | |
|---|---|---|
| PATENT NO. | : 7,549,107 B1 | Page 1 of 1 |
| APPLICATION NO. | : 09/573243 | |
| DATED | : June 16, 2009 | |
| INVENTOR(S) | : Joseph Paul Lauer | |

It is certified that error appears in the above-identified patent and that said Letters Patent is hereby corrected as shown below:

In column 11, line 24, in claim 21, delete "the" (second occurence) and insert -- a --, therefor.

In column 13, line 15, in claim 39, delete "interleaver" and insert -- interleaved --, therefor.

Signed and Sealed this

Fourteenth Day of December, 2010

David J. Kappos
*Director of the United States Patent and Trademark Office*